Aug. 20, 1935.  P. R. HAHNEMANN ET AL  2,011,629
CLUTCH FOR PUNCH PRESSES OR THE LIKE
Filed April 18, 1932   3 Sheets-Sheet 1
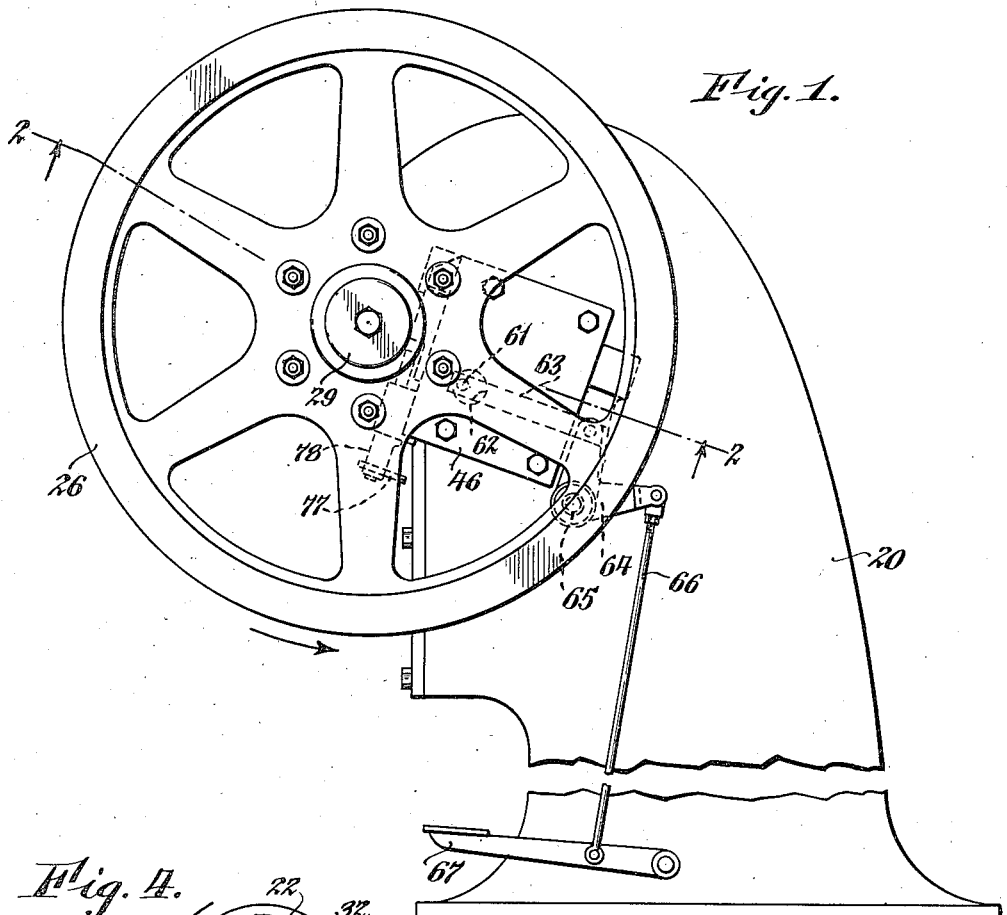
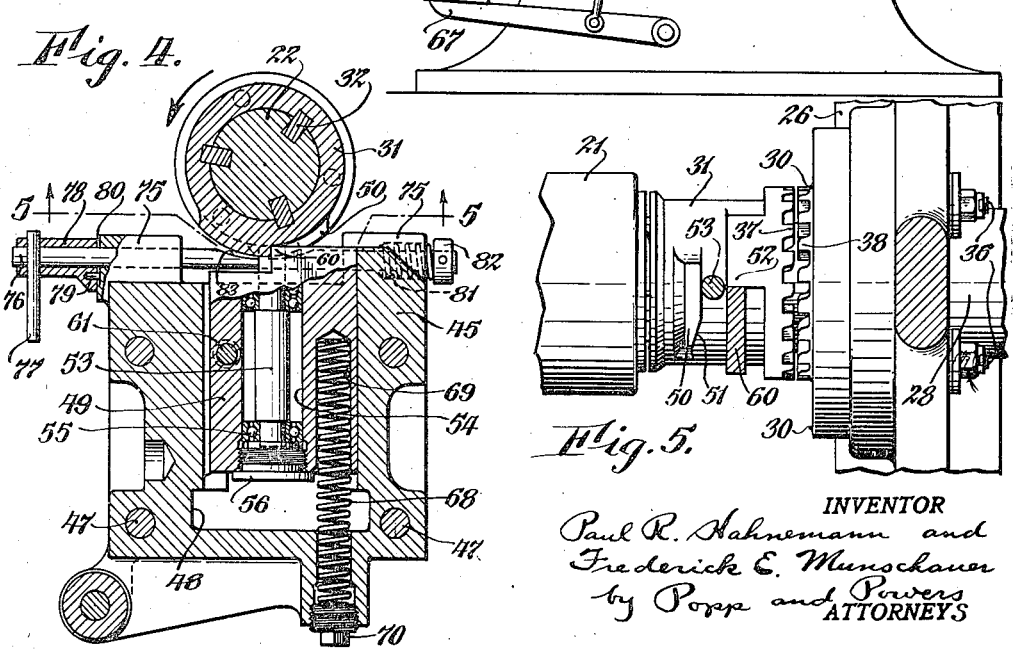
INVENTOR
Paul R. Hahnemann and
Frederick E. Munschauer
by Popp and Powers
ATTORNEYS Aug. 20, 1935.  P. R. HAHNEMANN ET AL  2,011,629
CLUTCH FOR PUNCH PRESSES OR THE LIKE
Filed April 18, 1932   3 Sheets-Sheet 2
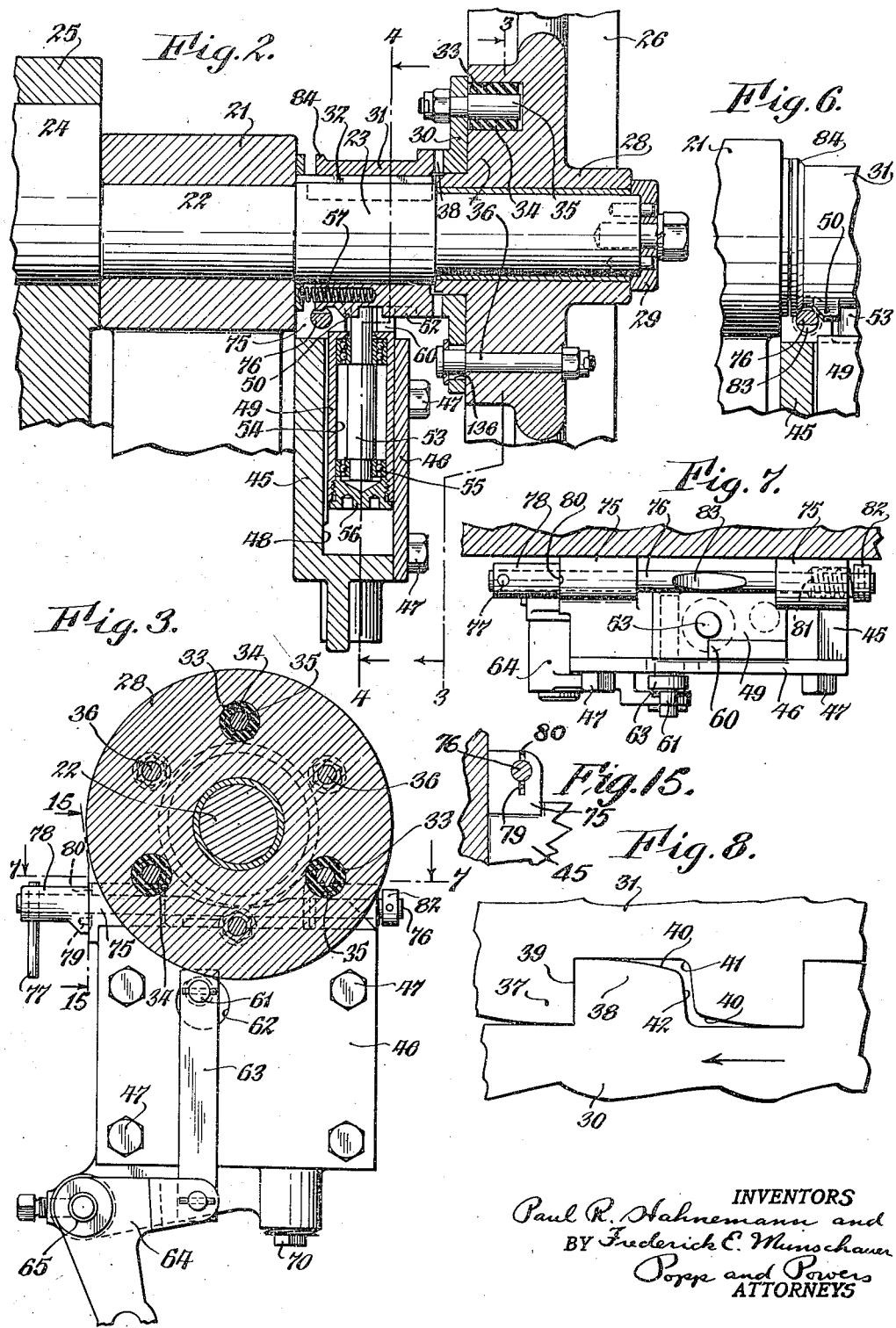
INVENTORS
Paul R. Hahnemann and
BY Frederick C. Munschauer
Popp and Powers
ATTORNEYS

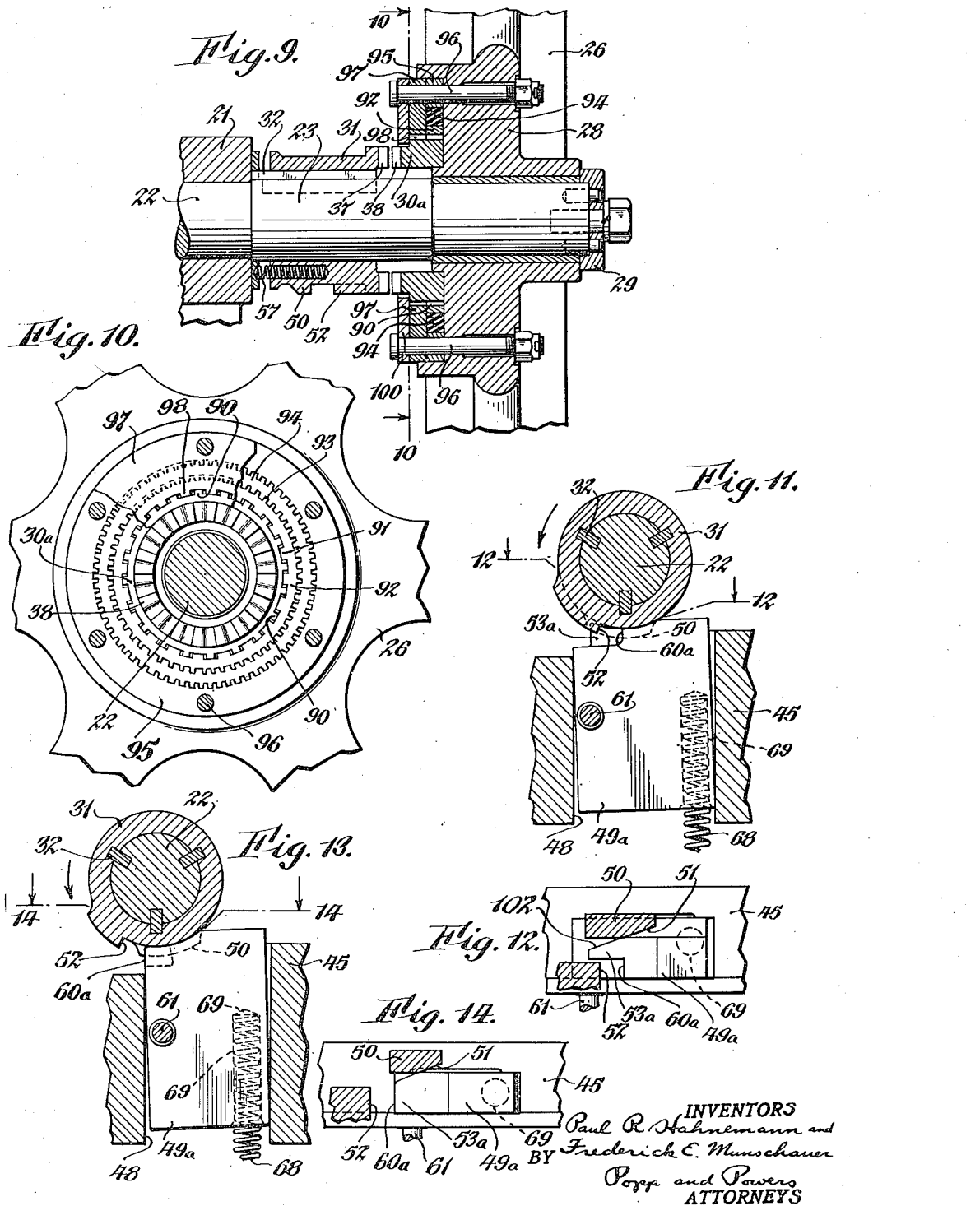

Patented Aug. 20, 1935

2,011,629

UNITED STATES PATENT OFFICE 2,011,629

CLUTCH FOR PUNCH PRESSES OR THE LIKE

Paul R. Hahnemann and Frederick E. Munschauer, Buffalo, N. Y., assignors to Niagara Machine & Tool Works, Buffalo, N. Y., a corporation of New York Application April 18, 1932, Serial No. 605,931

11 Claims. (Cl. 192—24)

This invention relates to a high speed clutch for punch presses, power shears or the like, and more particularly to a high speed clutch which is adapted for use in connection with a punch press for permitting the operator to couple the machine with a rapidly rotating power source at will in operating on the articles which the machine is designed to produce.

One of the objects of this invention is to provide such a high speed clutch for heavy loads which permits the operation of large punch presses at much higher speeds than has been possible heretofore and which instantaneously and reliably effects or releases the driving connection between a rapidly rotating power pulley and the main drive shaft of the punch press at the will of the operator and in which both operations are effected with little effort on the part of the operator.

A further object is to provide a high speed clutch having axially engaging elements provided with a large number of interengaging integral small annularly disposed teeth, these teeth being of such form that, especially when employed in combination with a shock absorber connection between the driving clutch element and pulley, they slip into engagement with one another at high speed, operate without any backlash and when engaged effect a positive driving connection between the clutch elements which can be easily and instantaneously released. The provision of such teeth also provides a clutch which is not subject to rapid wear and will engage with very little noise.

A further aim is to provide such a clutch which is entirely silent when in either its operative or inoperative position and in particular is free from the periodic click and the consequent wear which is usually present in clutches of this general type when in neutral due to an incomplete disengagement of the main clutch elements.

Another purpose is to provide a simple, reliable and accessible clutch lock which when moved to its operative or locked position will positively prevent the clutch from closing and which when moved to its inoperative position is completely inoperative and does not interfere with the normal functioning of the clutch. The clutch lock can also be engaged or moved to its locked position while the clutch is disengaged and requires no wrenches or other tools to lock or unlock it.

A further object is to provide in combination with the rotating main elements of the clutch a throw-out member which is movable into the path of certain of the rotating elements to effect an axial movement thereof and a disengagement of the clutch, which throw-out member comprises an antifriction roller mounted on ball bearings, rollers or the like, so that there is a minimum frictional wear both on this throw-out member and on the rotating parts it is adapted to engage.

Another purpose is to provide, in combination with such a throw-out member a stop member which is moved into the path of the rotating clutch elements after said throw-out member has operated so as to form a positive stop abutment for these parts. In the preferred embodiment of the invention the throw-out member and the stop member are so organized that any desired timing in their action can be provided.

Another aim is to reduce the number of parts employed in the clutch and to provide such a high speed clutch which is inexpensive to construct and at the same time is durable and will stand up under severe and constant use.

In the accompanying drawings:

Figure 1 is a fragmentary side elevation of a punch press having a clutch embodying my invention, this clutch being disposed between the driving pulley and the main power shaft of the press.

Figure 2 is a section taken on line 2—2, Fig. 1, and showing the positions of the parts when the clutch is closed and transmitting power from the pulley to the main drive shaft.

Figure 3 is a vertical section taken on line 3—3, Fig. 2.

Figure 4 is a vertical section taken on line 4—4, Fig. 2 and showing the positions of the parts when the clutch is opened and the driving connection broken.

Figure 5 is a horizontal section taken on line 5—5, Fig. 4.

Figure 6 is a fragmentary view similar to Fig. 2 and showing in detail the action of the clutch lock.

Figure 7 is a section taken on line 7—7, Fig. 3, and looking downwardly.

Figure 8 is an enlarged side elevation of the main engaging elements of the clutch and showing the exact form of the teeth of which a large number are provided on each one.

Figure 9 is a section similar to Fig. 2 and showing a modified form of confined rubber cushion between the driving pulley and the driving element of the clutch and showing the clutch in a released position.

Figure 10 is a section on line 10—10, Fig. 9, and showing the splined rubber ring which forms the modified form of the confined rubber cushion between the driving pulley and the driving element of the clutch.

Figure 11 is a view similar to Fig. 4 but showing a modified form of the clutch release.

Figure 12 is a section taken on line 12—12, Fig. 11.

Figure 13 is a view similar to Fig. 11 and showing a further modified form of the clutch release.

Figure 14 is a section taken on line 14—14, Fig. 13.

Figure 15 is a fragmentary vertical section taken on line 15—15, Fig. 3.

In its general organization this invention comprises a clutch for transmitting motion from a power pulley to a main drive shaft which includes a driven clutch sleeve and a driving clutch collar, the driving clutch collar being loosely mounted on the drive shaft and being connected with the driving pulley by means of a cushion of confined rubber and the driven clutch sleeve being splined to the main drive shaft and having a plurality of annularly disposed integral teeth which are rounded at their trailing corners and have inclined outer and trailing faces and are adapted to be moved into and out of similar teeth provided on the driving clutch collar. The means for effecting the movement of the driven clutch sleeve into engagement with the teeth of the driving clutch collar include a throw-out member mounted on a swinging block and means for swinging this block so as to move said throw-out member into and out of operative positions. This block preferably also includes a stop shoulder which follows the action of the throw-out member and subsequently engages a stop on the driven clutch member so that after the driven clutch member is thrown out of engagement with the driving clutch member this stop positively prevents further idle rotation of the driven clutch member. In the preferred embodiment of the invention the throw-out member is in the form of a roller which is suitably supported by roller bearings so as to minimize the frictional contact when it is thrown into operative engagement.

The invention also comprehends a clutch lock which is manually operable and which when moved to its operative position positively prevents the clutch from being closed.

The punch press in connection with which the present clutch is intended to be used includes a frame 20 which is formed to provide a bearing 21 in which the main drive shaft 22 of the punch press is journaled, as best shown in Fig. 2. On one side of the supporting bearing 21 the main drive shaft is formed to provide an enlarged portion 23 which holds it axially in position. In the punch press shown, one end of the main drive shaft 22 is formed to provide an eccentric 24 which reciprocates a member 25 which carries the dies or knife which operate on the sheet of metal in connection with which the punch press is used. The drive shaft 22 projects outwardly from the bearing 21 and at its outermost end carries a driving pulley 26 which is loosely mounted on the main drive shaft 22 and is continuously turned by a belt (not shown) or in any other suitable manner. This pulley has the usual hub 28 and is held on the driven shaft by a cap 29.

As best shown in Fig. 2, the main elements of the clutch comprise a driving collar 30 which is fixed to the hub of the driving pulley 26 and a driven sleeve 31 which is splined to the enlarged portion 23 of the drive shaft 22 by the spline 32, this spline permitting the driven clutch sleeve 31 to be moved axially into and out of engagement with the driving collar 30 but compelling the rotation of the driven clutch sleeve 31 with the drive shaft 22.

As hereinafter more fully described, the driving connection between the collar 30 and sleeve 31 consists of a large number of relatively small annularly disposed teeth which are made of special form to readily engage and disengage at high speeds without backlash and without strain or undue wear upon the parts. In cooperation with these teeth, a cushioned connection is provided between the driving clutch collar 30 and the pulley 26, this cushion connection preferably including a body of confined, incompressible but yielding material such as rubber. This cushioned connection has a number of functions: it delays the application of the force to the load and thereby provides the time interval necessary for the proper intermesh of the teeth before the application of the full force through the clutch; it effects an acceleration of the drive shaft in the press in contradistinction to the abrupt starting movement effected by a positive coupling clutch and thereby reduces the strain on the different parts of the machine; it dampens and absorbs the shocks and jars that are incident to standard clutches on large machines; it prevents a rebound or backlash of the clutch through the spring action of the metal to metal engagement of its teeth, that is, the teeth in engaging are subjected to a strain to which they react and effect an undesired backlash, this backlash being prevented by the cushioned connection in the present clutch; and the cushioning means returns the clutch parts to a neutral condition after each use of the clutch. However, to prevent undue strain on the cushioning means and still secure the above advantages, a positive stop is provided which limits the cushioning action of the cushioning means and provides a positive drive under strains excessive to the cushioning means.

In the form of the invention shown in Figs. 1–5, a plurality of enlarged cylindrical recesses 33 are provided in the hub 28 of the driving pulley, these recesses being arranged concentric about the axis of the hub and being provided in any suitable number, three being shown. In each of these recesses is arranged a rubber sleeve or cushion 34 and passing through these sleeves and holding each of these sleeves under compression is a pin 35. Each of these pins is provided with a reduced threaded neck and this neck extends through and is securely held to the adjacent face of the driving clutch collar 30 by a nut. The driving clutch collar 30 is rotatable relative to the pulley 26 to a limited extent but is held against axial movement relative thereto by a plurality of stop bolts 36 which extend through enlarged openings 136 in driving clutch collar 30 and also through the hub 28 of the pulley 26. Any number of these stop bolts can be provided, but they are preferably spaced uniformly between the cushioning pins 35 so that three are shown. Each of these stop bolts is provided with an enlarged head and a washer is preferably interposed between this head and the adjacent face of the driving clutch collar 30 and that portion of each stop bolt which is arranged within the enlarged hole 136 is also preferably enlarged so that the stop bolts 36 can be tightly drawn up without clamping the driving clutch collar 30 against the face of the hub 28. It will be observed, however, that the holes 136 are larger than the enclosed enlarged portions of the bolts 36 so that a definite relative rotary movement of the clutch collar 30 and the pulley 26 is permitted by these stop bolts, this movement being, however, yieldingly resisted and cushioned by the rubber sleeve and pin connections, 34, 35, between these parts. The stop pins 36, however, serve as a definite, positive stop to this movement and limit the amount of force which can be applied through the rubber sleeves 34 and also limit the movement of the pins 35 against these sleeves. In actual practice, the initial starting torque or load is transmitted through the rubber sleeve and pin connections 34, 35, but in the event of an excessive force applied through the clutch, the stop bolts 36 engage the corresponding sides of the enlarged openings 136 and form a positive driving connection between the pulley 26 and driving clutch collar 30 and thereby relieve the rubber sleeves 34 from excessive and damaging strain. As soon, however, as this excessive strain is relieved the reacting force of the rubber sleeves 34 in returning to their original form, releases the engagement between the sides of the stop pin 36 and the driving clutch collar 30 and thereafter the drive is through the cushions 34 and the pins 35.

In combination with this cushioned connection between the hub of the pulley 26 and driving clutch collar 30, the present invention proposes a special form of toothed connection between the driving clutch collar 30 and the driven clutch sleeve 31. Heretofore a tooth and pin connection has been employed in clutches of this character, but to secure a strong and reliable clutch which will operate at high pulley speeds and with heavy loads it has been found necessary, in addition to the cushioned connections between the pulley and driving clutch collar, to provide a very large number of intermeshing teeth which are of such form as to permit of the rapid and sure engagement and release of the driving clutch collar and the driven clutch sleeve. Thus, it has been found that a relatively large number of teeth 37 must be provided on the driven clutch member 31 and a correspondingly large number of teeth 38 must be provided on the driving clutch member 30. These teeth are arranged in regular order about the clutch members and extend axially so that upon moving the driven clutch member axially outward its teeth 37 engage with the teeth 38 of the driving clutch member and effect a positive and reliable engagement between the clutch parts which continues until the driven clutch collar is positively moved back. For this purpose the driving faces 39 of these teeth are abrupt and are radially disposed and form abrupt square shoulders which interengage squarely so that there is no tendency for these teeth to slip out of engagement with one another. To facilitate their engagement and disengagement, however, the trailing corner of each of the teeth 37 and 38 is preferably rounded and cut away, as indicated at 40, and the trailing corner at the base of each of the teeth 37 and 38 is also preferably rounded, as indicated at 41. In addition, the rear or trailing face of each of the teeth 37 or 38 is preferably inclined relative to the axis of the drive shaft, as indicated at 42. It is therefore apparent that each tooth has an abrupt rectangular advancing corner, an outer face which curves downwardly and rearwardly from this abrupt corner and terminates in a rounding trailing outer corner and an inclined rear side which terminates in a rounding corner at the base of the tooth. This provides a tooth which is smaller than the space between the teeth and also provides a tooth which is of such rounding form that it readily slides into engagement with its opposing teeth without excessive noise, friction or wear. It has been found that such teeth provided in a large number in a clutch of the present character provide a clutch which is instantly operable, extremely strong and not subject to excessive wear. The inclined trailing faces 42 of the teeth are disposed at an outwardly tapering angle to the front face but this angle must be made sufficiently small so that in the event of a backlash of the teeth, the clutch will not be thrown out. By forming the trailing faces of the teeth 37 and 38 so that their angularity is less than their limiting angle of friction or their angle of repose, any tendency of these teeth, in a backlash of the clutch, to throw the clutch out is avoided. It will also be observed that by making the teeth integral with the clutch sleeve and collar, stronger and lighter clutch sleeves and collars can be employed than would be necessary if separate teeth were inserted. The use of a large number of small teeth also, of course, reduces the necessary distance of travel of the clutch members from completely closed to open positions.

Adjacent the driven clutch sleeve 31 a casing is mounted on the machine frame and includes a plate 45 and a cover 46, the casing being secured by bolts 47 which extend through to the machine frame. As best shown in Figs. 2 and 3, the plate 45 is formed to provide a rectangular pocket 48 which is open at the end adjacent the driven clutch sleeve 31. In this pocket is loosely arranged an oblong block 49 which carries the means for throwing the clutch sleeve 31 out of engagement with the driving clutch collar 30 and also the means for subsequently arresting further idle motion of the driven clutch sleeve 31. For this purpose the driven clutch sleeve 31 is formed to provide a cam lug 50 which extends radially outward from one side of the driven clutch sleeve and at its advancing end is formed to provide a tapered cam face 51 which opposes the main driving pulley 26. In axial alinement with the rear or trailing edge or end of this cam lug 50 the driven clutch collar is formed to provide a stop lug 52, a space being provided between this stop lug 52 and the cam lug 50 for a purpose which will presently appear.

Arranged centrally within the block 49 is a roller or pin 53 the greater part of which is arranged within a recess 54 in the block 49. The central part of this roller 53 is enlarged and its reduced ends are journaled in ball bearings 55, these bearings being arranged within the recess 54. The inner end of the pin or roller 53 is preferably supported by a plug 56 which screws into the recess 54 and the outer reduced end of the roller 53 projects toward the drive shaft 22 into the path of the cam lug 50 on the driven clutch sleeve 31. It is apparent that when the block 49 is moved toward the shaft 22 the outer end of the roller 53 is moved into the path of the cam lug 50 of the driven clutch sleeve 31 and upon engaging the cam face 51 thereof necessarily draws the clutch sleeve 31 axially away from the collar 30 and consequently effects a disengagement of the teeth 37 and 38 and an opening of the clutch. Upon withdrawing the clutch block 49 the roller 53 is withdrawn from engagement with the cam lug 50 and compression springs 57 return the clutch sleeve 31 into operative engagement with the driving clutch collar 30. It is also apparent that since the pin 53 is in the form of a roller the friction between it and the cam lug 50 is greatly reduced and consequently the wear between these parts is also reduced. It is also apparent that it is desirable to have the upwardly projecting end of the roller 53 of as small a diameter as possible since the smaller its diameter, the smaller is the distance it is required to ride over the shoulder of the cam 50.

After the clutch has been opened it is desirable to provide a positive stop to prevent the further idle rotation of the driven clutch sleeve 31 and the punch press mechanism associated with it. Unless this provision were made, as best indicated in Fig. 5, the throw-out roller 53 would be liable to ride beyond the end of the cam lug 50 and permit the clutch to accidentally reengage and effect an accidental operation of the punch press. To prevent this, the block 49 is provided with a stop shoulder or projection 60 which is arranged in the path of the stop lug 52 of the driven clutch sleeve 31. When the block 49 is raised to throw the upper end of the roller 53 into the path of the cam lug 50 the stop shoulder or projection 60 of this block is also thrown into the path of the stop lug 52 of the clutch sleeve 31. It is therefore apparent that after the roller 53 has thrown the driven clutch sleeve 31 out of engagement with the driving clutch collar this stop shoulder 60 of the block 49 will engage the stop lug 52 of the driven clutch sleeve and positively prevent its further rotation. It is apparent that there must be a timed relation in the operation of the throw-out pin 53 and the stop shoulder or projection 60. This is obtained by arranging the cam lug 59 substantially in advance of the stop lug 52, as best shown in Fig. 5. Since these elements are both formed integrally and on the same side of the driven clutch sleeve 31 it is apparent that they can be readily designed to provide any desired lag in the action of the stop shoulder. For example, if a greater or less lag is desired, the corresponding faces of either the stop lug 52 or the cam face 51 of the cam lug 50 can be cut down accordingly.

In one side of the block 49 a pin 61 is mounted, this pin projecting laterally outward from the block and through an opening 62 in the casing cover 46. This opening 62, as best shown in Fig. 3, limits both the inward and outward movement of the block 49 by forming a stop for its pin 61. To the outer end of this pin is pivotally secured a bar or link 63 the other end of which is pivotally secured to the bifurcated end of one arm of a bell crank lever 64. This bell crank lever is pivotally mounted at its center on the main clutch plate 45 of the machine, as indicated at 65, and its other arm connects with a shipper rod 66. The lower end of this shipper rod 66 connects with a foot treadle 67 between its pivotal connection with the machine frame and its tread. This treadle is normally held in its elevated position by a spring 68 which is arranged in a recess 69 at one side of the block 49 and bears against a screw plug 70 provided at the end of the casing adjacent the bell crank lever 64.

It is apparent that when the operator steps on the treadle 67, the bell crank lever will be rocked downwardly and rearwardly and the block 49 will be drawn rearwardly thereby disengaging its roller 53 and stop shoulder 60 from the cam lug 50 and stop lug 52 of the clutch sleeve 31. This permits the springs 57 to move the driven clutch sleeve 31 into engagement with the driving collar 30 and effect a closing of the clutch. Upon releasing the treadle the spring 68 moves the block 49 forwardly and moves the pin 53 and stop shoulder 60 into the path of the cam lug 50 and stop lug 52, respectively, of the driven clutch sleeve 31. As soon as the cam lug 50 engages the end of the roller 53 it is moved axially away from the driving pulley 26, as best shown in Fig. 5, and the teeth 37 of the driven clutch sleeve 31 are disengaged from the teeth 38 of the driving clutch collar 30. Thereafter the stop projection 60 on the block 49 engages the stop lug 52 and the driven clutch sleeve 31 and arrests the idle rotation of the driven clutch sleeve and holds the parts in the position shown in Fig. 5 until the operator again steps on the treadle 67.

In the absence of provision to prevent it the retraction of the driven clutch sleeve 31 stops the moment that the roller 53 has ridden up on the cam lug 50 just far enough to free the teeth 37 from the teeth 38. This movement of the driven clutch sleeve 31, while sufficient to break the driving connection, is not sufficient to break all contact between the teeth 37 and 38 and consequently the teeth will still contact and produce an undesirable clicking noise as the teeth rotate. To eliminate this clicking noise and also to avoid the resultant wear on the teeth 38 while the clutch is in neutral, means are provided for a secondary retraction of the driven clutch sleeve 31 after the driving connection between the teeth 37 and 38 has been broken. This secondary retraction means retracts the sleeve 31 further and moves it so that its teeth 37 are completely out of contact with the teeth 38 of the driving collar and eliminates all noise and wear when the clutch is in neutral. For this purpose the pocket 48 in the plate 45 which contains the block 49 is wider than the block 49 so that the block has a limited lateral play therein about its pivotal connection with the bar or link 63 as an axis. The recess 69 is drilled into the cam block 49 on the side opposite from this pivotal connection and it is therefore apparent that the tendency of this spring is to throw the outer or operative end of the block 49 forwardly and downwardly about the pivotal connection 61 between the block and the link 63.

Assuming the clutch to be in operation with the foot treadle depressed, upon releasing the treadle the bell crank lever is rocked forwardly and the block 49 is moved forwardly or outwardly by the link and bar 63 which connects these members. This moves the pin 53 into the path of the cam lug 50 and as soon as the roller or pin 53 strikes the cam surface 51 it rides up on it and retracts the cam lug and the driven coupling sleeve 31 from engagement with the teeth of the driving collar 30. As soon as the roller 53 strikes the cam lug 50, the impact between these members causes the block 49 to be driven upwardly against the top of the pocket 48, against the resistance of the spring 68. As soon as the roller 53 has ridden up on the cam lug 50 far enough to release the driven clutch sleeve 31 from engagement with the driving collar 30 the effect of the impact against the roller 53 ceases and hence the return spring 68 thereupon comes into action and forces the block 49 to rotate about its pivotal connection with the bar 63. This secondary movement of the block 49 causes the roller 53 to ride further along the cam face 51 of the cam lug 50 and retracts the driven coupling sleeve 31 further from the driving collar 30. It is therefore apparent that by the provision of this means for providing a secondary retraction of the driven clutch sleeve 31 through a reacting motion of the block 49, the sleeve 31 is withdrawn sufficiently far to provide a definite clearance between it and the driving clutch collar 30. It is apparent that when the clutch is in neutral there can be no ineffectual contact between the teeth 37 and 38 which would result in a disagreeable noise as well as wear between these parts.

It is frequently desirable to lock the clutch in its inoperative position so that it is impossible to operate the press until this lock is purposely released. It is further desirable to provide such a lock which can be operated while the press is in operation and without the use of tools. For this purpose two lugs 75 are formed integrally at the upper end of the stationary plate 45 on opposite sides of the drive shaft 22 and these lugs 75 slidingly and rotatably receive a locking bar 76. This locking bar 76, as best shown in Figs. 4 and 7 is provided with a laterally extending handle 77 by means of which the bar 76 can be turned. This handle also extends through a sleeve 78 which carries a small pin 79. This small pin rides upon the flat end face of the corresponding lug 75 and is adapted to drop into one of two small notches or grooves 80 in the end face of this lug under the influence of the spring 81. The purpose of these grooves is to provide two extreme positions of the locking bar and to retain the locking bar in either of these positions. The central part of the bar 76 is cut away as indicated at 83 and the inner end of the driven clutch sleeve is provided with an annular outwardly extending flange 84. When the bar 76 is arranged with its cut away portion 83 facing the sleeve 31 the sleeve 31 is free to be reciprocated axially along the drive shaft 22. When, however, the driven clutch sleeve 31 is retracted from engagement with the driving collar 30 and the bar 76 is turned so that its cut away portion faces away from the clutch sleeve 31, as indicated in Fig. 6, it is apparent that the clutch sleeve 31 is locked out of engagement with the driving clutch collar 30 and cannot return until the bar 76 is turned since the solid part of the bar 76 is held in contact with the flange 84 and prevents this return movement of the sleeve. It is therefore apparent that this provides a very simple and effective lock to latch the clutch in its inoperative or neutral position and the locking of this clutch can be effected without the use of tools. The lock is also positive, there being no tendency of spring pressure to accidentally release the lock.

In the modified form of the invention shown in Figs. 9 and 10 a different form of cushioned connection between the driving pulley 26 and the toothed driving collar 30a is provided, this modified construction being in all other respects identical to the preferred form of the invention shown in Figs. 1–8. In this modified form of cushioned connection the driving clutch collar 30a is formed to provide a plurality of radially outward extending splines or feathers 90 which engage with corresponding radially inward extending splines or feathers 91 of a metal ring 92. This metal ring 92 is also provided with a large number of smaller radially outwardly extending splines or feathers 93 and these last named splines or feathers engage with corresponding splines or feathers provided in a rubber ring 94. This rubber ring is also provided with a plurality of radially outwardly extending splines or feathers which engage corresponding splines or feathers provided in an outer ring 95. This last named outer ring is bolted to the hub 28 of the driving pulley by bolts 96, these bolts also passing through a ring 97 which has a plurality of inwardly projecting radial teeth 98 which mesh with the radially outward projecting teeth 90 of the collar 30a. A substantial clearance is left between the teeth 98 and 90 which permits the collar 30a to rotate a limited distance relative to the pulley 26, this movement, of course, being resisted by the rubber ring 94. The bolts 96 also pass through and secure a retaining plate 100 in position. On closing the clutch at high speed under a heavy load, since the force is applied through the pulley 26, bolts 96, ring 95, rubber ring 94, ring 92 to the collar 30a, the rubber ring 94, through its resiliency, yields and provides the necessary cushioning to take the impact force and provide the necessary time element for the teeth of the clutch to interengage as in the form of the invention shown in Figs. 1–8. In the event of an excessive force, the rubber ring 94 is compressed to the point where the teeth 98 of the ring 97 engage the corresponding teeth 90 of the collar 30a. When this occurs the drive is through the pulley 26, bolts 96, ring 97 and teeth 98 and 90 to the clutch collar 30a. This positive drive persists until the excess force is relieved when the resilience of the rubber ring 94 will effect a disengagement of the teeth 98 and 90 and the drive will continue through the rubber ring. It is apparent that the ring 97 forms a positive stop which prevents shearing of the rubber ring, thereby serving the same purpose as the loosely fitted bolts 36 in the form shown in Figs. 1–8. The purpose of mounting the rubber ring 94 between two removable metal rings 92 and 95 is to facilitate replacement of the rubber ring as it becomes worn. Thus the rubber ring and its encasing metal rings 92 and 95 are removed from the machine as a unit and returned to the factory for replacement of the rubber ring. This greatly facilitates the repair of the machine since special equipment is required for the replacement of the rubber ring itself.

In the form of the invention shown in Figs. 11–14 the block 49a is of substantially the same construction as the block 49 shown in the preferred construction except that instead of providing the roller 53 mounted in ball bearings 55, this roller is replaced by a lug 53a which is formed integrally with the cam block 49a and is provided with a cam face 102 which rides against the cam face 51 of the cam lug 50 as in the preferred construction. As in the preferred form the driven clutch sleeve 31 is formed to provide a stop lug 52 which is engaged by a stop projection 60a on the block 49a, these two functioning in the same manner as in the preferred construction to positively stop the rotation of the driven clutch sleeve 31 after the clutch has been thrown into neutral by the action of the cam surfaces of the cam lugs 53a and 50 on the clutch block 49a and sleeve 31, respectively. It is therefore apparent that this form of the invention is substantially identical to the preferred form except that the throw-out roller 53 is substituted by a solid cam lug.

In Figs. 11 and 12 the timing between the action of the throw-out cam lug 50 and stop lug 52 is such that the stop lug 52 acts immediately after the throw-out lug 50. In Figs. 13 and 14 this timing or lag is increased so that the stop lug 52 does not act until a substantial time after the throw-out lug has acted. In other words, a greater lag is provided between the action of these elements in the form shown in Figs. 13 and 14 as compared with the form shown in Figs. 11 and 12.

As a whole this invention provides a comparatively simple and inexpensive clutch for the drive shaft of punch presses or the like in which noise is eliminated particularly when the clutch is in neutral. The provision of a large number of teeth, eighteen being shown, also provides a clutch which is capable of transmitting heavy loads and which at the same time, through the rounding form of the teeth is instantaneously and easily thrown into and out of operation. The invention also comprehends, particularly in combination with the special teeth shown, a cushion of an incompressible but yielding material, such as confined rubber, between the driving clutch member and the pulley, this cushion permitting a slight relative rotative movement of the pulley and driving clutch member so as to absorb the starting loads, provide the necessary time element for the teeth of the clutch to interengage and prevent any backlash of the clutch. The invention also provides anti-friction means for throwing the main clutch members into and out of engagement with one another. The invention also provides a stop which positively stops the operation of the punch press after the clutch has been thrown out so that there is no danger of the clutch or machine overrunning. The clutch is also extremely compact and will stand up under conditions of severe and constant use without getting out of order.

We claim as our invention:

1. A clutch for the drive shaft of a punch press or the like, including a driving member loosely mounted on said shaft, a coupling sleeve splined to said shaft and movable axially into engagement with said driving member, said driving member being provided with a relatively large number of integral, axially extending, relatively small, uniformly spaced and shaped teeth, the extent of each space between said teeth being substantially in excess of the corresponding dimension of each tooth and each tooth being formed to provide an abrupt advance face, an end face tapering inwardly toward the trailing end of the tooth and merging into a rounding trailing outer corner, said rounding corner merging into an inclined trailing face and a rounding corner at the base of the trailing end of said tooth, whereby each tooth is of rounding tapered form in both outward and rearward directions, and said trailing rear face being inclined at an angle less than its angle of repose to prevent accidental throwing out of the clutch during backlash, and said coupling sleeve being formed to provide similar cooperating teeth and means for moving said sleeve axially so as to intermesh said teeth.

2. A clutch for punch presses or the like, including a rotatable driving member, a driven member, a coupling member rotatable with one of said members and movable axially into coupling relation with the other member and retractable therefrom, an abutment carried by said coupling member and having a cam face and a land at the crest of said cam face, a block slidably arranged adjacent said coupling member and slidable radially toward and from said coupling member, a bearing in said block, a shaft in said bearing and having one end of relatively small diameter projecting outwardly from said block, means for moving said block to move the projecting end of said shaft into the path of said cam face, said shaft and cam face cooperating to move said coupling member axially out of engagement with the member with which it couples and said shaft being rotated through its contact with said cam abutment to reduce friction and riding over the ridge at the crest of said cam face and onto said land.

3. A clutch for punch presses or the like, comprising a rotatable driving member, a driven member, a coupling sleeve rotating with said driven member and movable axially into and out of engagement with said driving member, said sleeve being provided with an outwardly extending flange and a lock for holding said sleeve out of engagement with said driving member, comprising a bar having a reduced portion and arranged in the path of said flange, said bar being movable to a position where said reduced portion is in the line of movement of said flange and said flange is permitted to pass and being also movable to a position where the thicker portion of said bar is in the path of said flange and its movement arrested.

4. A clutch for punch presses or the like, comprising a rotatable driving member, a driven member, a coupling sleeve rotating with said driven member and movable axially into and out of engagement with said driving member, said sleeve being provided with an outwardly extending flange and a lock for holding said sleeve out of engagement with said driving member, comprising a bar having a flattened portion on one side and arranged in the path of said flange, said bar being rotatable to bring said flat in the line of movement of said flange and permitting its passage and being also rotatable to bring said flat out of the line of movement of said flange whereby its movement is arrested by said bar.

5. A clutch for the drive shaft of a punch press or the like, including a driving member loosely mounted on said shaft, a coupling sleeve splined to said shaft and movable axially into engagement with said driving member, said driving member being provided with a relatively large number of axially extending, relatively small, uniformly spaced and shaped teeth, the extent of each space between said teeth being substantially in excess of the corresponding dimension of each tooth and each tooth being formed to provide an abrupt advance face and an inclined trailing face, said trailing face being inclined at an angle less than its angle of repose to prevent accidental throwing out of the clutch during backlash, and said coupling sleeve being formed to provide similar cooperating teeth and means for moving said sleeve axially so as to intermesh said teeth.

6. A clutch for punch presses or the like, including a rotating driving member, a rotatable driven member, a coupling member rotatable with said driven member and movable axially into coupling relation with said driving member and retractable therefrom, an abutment provided on said coupling member and having a cam face and a land at the crest of said cam face, a rotatable shaft having its shank rotatably carried by a bearing and having one end of relatively small diameter and cantilevered outwardly therefrom and means for moving said bearing to project said shaft into the path of said cam face, said shaft and cam face being so formed that, upon engaging, said abutment and coupling member are moved axially to break the driving connection between said coupling and driving members and said shaft rotating on striking said cam face to reduce the friction therebetween, and riding over the ridge at the crest of said cam face onto said land.

7. A clutch for punch presses or the like, including a rotating driving member, a rotatable driven member, a coupling member rotatable with said driven member and movable axially into coupling relation with said driving member and retractable therefrom, an abutment provided on said coupling member and having a cam face and a land at the crest of said cam face, a rotatable shaft having an external bearing surface, a bearing receiving said shaft and means for moving said bearing to project the end of said shaft into the path of said cam face, said rotatable shaft and cam face being so formed that, upon engaging, said abutment and coupling member are moved axially to break the driving connection between said coupling and driving members and said shaft rotating on striking said cam face to reduce the friction therebetween and riding over the ridge at the crest of said cam face onto said land.

8. A clutch for punch presses or the like, including a rotating driving member, a rotatable driven member, a coupling member rotatable with said driven member and movable axially into coupling relation with said driving member and retractable therefrom, an abutment provided on said coupling member and having a cam face and a land at the crest of said cam face, a rotatable shaft having an external bearing surface, a bearing receiving said shaft and means for moving said bearing to project the end of said shaft into the path of said cam face, the effective part of said shaft which engages said cam face having a smaller diameter than the bore of said bearing and said rotatable shaft and cam face being so formed that, upon engaging, said abutment and coupling member are moved axially to break the driving connection between said coupling and driving members and said shaft rotating on striking said cam face to reduce the friction therebetween, and riding over the ridge at the crest of said cam face onto said land.

9. A clutch for punch presses or the like, including a rotating driving member, a rotatable driven member, a coupling member rotatable with said driven member and movable axially into coupling relation with said driving member and retractable therefrom, an abutment provided on said coupling member and having a cam face and a land at the crest of said cam face, a rotatable shaft having an external bearing surface and an end of reduced diameter, a bearing receiving and rotatably supporting the enlarged part of said shaft and means for moving said bearing to project the reduced end of said shaft into the path of said cam face, the reduced end of said rotatable shaft and cam face being so formed that, upon engaging, said abutment and coupling member are moved axially to break the driving connection between said coupling and driving members and said shaft rotating on striking said cam face to reduce the friction therebetween and riding over the ridge at the crest of said cam face onto said land.

10. A positive clutch for punch presses or the like, comprising a rotatable driving member, a driven member, a coupling member rotatable with said driven member and movable axially into coupling relation with said driving member, the adjacent faces of said driving and coupling members being formed to interengage, a throwout abutment carried by said coupling member and having a cam face and a land at the crest of said cam face, a stop abutment mounted in fixed relation to said throwout abutment, a slidable block arranged adjacent said coupling member, said block being slidable radially toward and from said coupling member and having throwout and stop abutment means including a rotatable shaft having an external bearing surface, a bearing in said block and receiving said shaft, the end of said shaft being of relatively small diameter and being projected into the path of said cam face, said rotatable shaft and cam face being so formed that, upon engaging, said coupling member is moved axially to break the driving connection between said coupling and driving members and said shaft rotating on striking said cam face to reduce the friction therebetween, and riding over the ridge at the crest of said cam face and onto said land, and said stop elements subsequently engaging and arresting the continued idle movement of said driven member.

11. A clutch for punch presses or the like, including a rotating driving member, a rotatable driven member, a coupling member rotatable with said driven member and movable axially into coupling relation with said driving member and retractable therefrom, an abutment provided on said coupling member and having a cam face and a land at the crest of said cam face, a rotatable shaft for retracting said coupling member having its shank rotatably mounted in a bearing and having one end of relatively small diameter projecting from said bearing and adapted to be moved into the path of said abutment and means for moving said shaft into the path of said abutment, said shaft and cam face being so formed that, upon engaging, said abutment and coupling member are moved axially to break the driving connection between said coupling and driving members and said shaft rotating on striking said abutment to reduce the friction therebetween and riding over the ridge at the crest of said cam face and onto said land.

FREDERICK E. MUNSCHAUER.
PAUL R. HAHNEMANN.